Inventor:
Hans Erich Hollmann
By  *Karl Nath*
Attorney

Patented Aug. 8, 1933

1,921,187

UNITED STATES PATENT OFFICE 1,921,187

ULTRA-SHORT-WAVE SYSTEM

Hans Erich Hollmann, Berlin-Charlottenburg, Germany, assignor, by mesne assignments, to American Telephone and Telegraph Company, a Corporation of New York Application October 22, 1931, Serial No. 570,385, and in Germany October 13, 1930

12 Claims. (Cl. 250—20)

My invention relates to systems for short electric waves of less than about one meter length and more particularly to a novel method and means for receiving such waves.

Short electric waves having a wave length of the order of less than one meter down to a few centimeters or millimeters, among other advantages, almost behave like light waves, being able to be concentrated into a narrow beam, and thus may be successfully used in place of light waves for signalling or control purposes whenever the use of the latter becomes prohibitive such as in adverse atmospheric conditions as in fogs and the like.

When receiving ultra-short-waves of the above mentioned range of wave length, as will be readily understood, using the ordinary vacuum tube receiving means, the time of transit of the electrons within the tube comes within the range of the oscillation period of the received wave which makes it impossible to use the ordinary short wave receiver for the present purpose of ultra-short-wave reception.

Accordingly it is one of the main objects of my invention to present a novel method and means for receiving and translating ultra-short-waves signals.

Another object of my invention consists in the provision of a new receiving circuit for ultra-short-waves comprising a receiving vacuum tube operating in accordance with the invention and means for effectively coupling such tube to an ordinary vacuum tube amplifier.

A further object of my invention is to provide a receiving circuit for modulated ultra-short-waves and means for operating the same whereby an optimum of sensitivity to the incoming signalling energy is secured and in which the receiving energy is amplified effectively and with a minimum of losses incurred.

These and further objects and aspects of my invention will become more apparent through the following description taken with reference to the accompanying drawing in which I have illustrated by way of example a few circuits in which the invention is embodied. However, I wish it to be understood that the ensuing description together with the drawing should be regarded as illustrative only of the underlying principle of the invention which, as will become obvious, is subject to many modifications and variations coming within its broader scope and spirit as set forth in the appended claims.

Fig. 1 of the drawing illustrates a simple receiving circuit showing the underlying principle in accordance with the invention.

Similar reference numerals identify similar parts throughout the different views of the drawing.

With the above objects in view, the invention makes use of what is known in the art as the Barkhausen-Kurz, or braking field method of producing electric oscillations of extremely short wave length. According to this method, vacuum tubes of ordinary design having cathode, grid and anode electrodes are used, but contrary to the well known use in the ordinary long and short wave systems, the tube is operated with a high positive potential on the grid or other foraminous electrode, the anode being maintained at zero or a slightly negative potential. With the proper adjustment of these potentials as well as of the electron emission as by means of varying the filament heating current, a condition is obtained whereby the electrons emitted from the cathode and attracted by the positive grid, after passing the meshes of the latter will have to back up against the opposing anode potential, thereby gradually losing their speed in such manner that the movement is reversed in front of the anode and that the electrons are returned to the grid. The resultant effect of the entire emission stream thus obtained is a direct oscillation of the cloud of electron emission about the grid electrode, in such a manner that a circuit system preferably in the form of a two wire standing wave arrangement of known design properly tuned and connected with the tube will be excited in the natural period of the electron oscillation and may serve for practical utilization of the oscillations for signalling or other purposes. As will readily be understood, the frequency of the oscillations is substantially independent of any electrical constants of the outside circuits connected with the tube, but is determined solely by the speed with which the electrons are travelling and by the distance between the tube electrodes. Thus as will be readily seen, the frequency may be varied by either varying the operating potentials or preferably by varying the heating current thus controling the initial speed with which the electrons are liberated from the cathode.

Referring to the particular feature in accordance with the invention applicant discovered that a free anode as according to the above described method has the tendency to accumulate a negative charge, in a manner as the grid electrode of the tube operated in the usual connection. The slightest influence on the electron movement will entail a large variation of this negative potential charge on the free anode. Thus, if the electron movement is influenced in accordance with the incoming modulated oscillations the anode potential will also vary in accordance with the modulating signal frequency.

Figure 1:
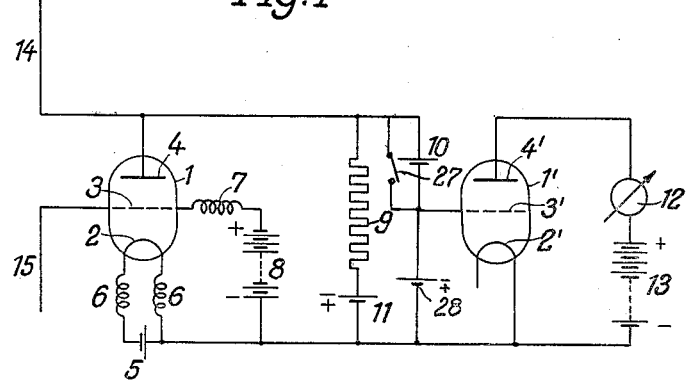

In accordance with the present invention, the anode potential variations are directly applied to the grid or other control electrodes of an ordinary amplifying tube in such a manner that the invention constitutes an ideal case of a direct coupled vacuum tube circuit. Referring more particularly to Fig. 1 of the drawing, I have shown two vacuum tubes 1 and 1' of well known construction having cathodes 2 and 2', grid electrodes 3 and 3', and anodes 4 and 4' respectively. The tube 1 called the receiving tube proper is operated according to the above described braking field method having a high positive potential applied to its grid 3 supplied by a battery 8 in series with a choke coil for blocking the high frequency currents against the battery. The anode 4 carries a slightly negative potential provided by a further battery 11. This latter battery may be dispensed with and the anode operated at zero potential to obtain satisfactory results in most cases. The cathode 2 is maintained at emitting temperature by means of the heating battery 5 with choke coils 6 inserted in the heating current leads to prevent high frequency energy from entering the battery.

The grid and anode are connected to a dipole antenna 14—15 for receiving incoming short wave signals from a transmitter which may operate according to the same principle as outlined. The anode of tube 1 is directly connected to the grid of the amplifying tube 2 if necessary with a battery 10 inserted in the grid lead for compensating the anode potential and for providing a suitable grid bias for the tube 1'. The tube 1' is operated by means of the high potential source 13 with a translating device 12 such as a meter, telephone, etc., being inserted in the anode circuit. A leak resistance 9 may preferably be placed between cathode and anode of the receiving tube to allow excessive negative charge on the anode to be carried off in a similar manner to the well known grid leak action of the ordinary detector tube. In accordance with the present invention the receiving tube 1 by proper adjustment of the heating current and of the grid potential is maintained at such a condition that the tube is close to the point of oscillation when no receiving waves are exciting the antenna. In this case only an extremely small anode current is flowing and the tube is mostly sensitive to incoming short wave signals.

The receiving circuit in accordance with the invention constitutes a great improvement over the older inefficient method of connecting a telephone, audio transformer or other translating device directly in the anode circuit of the receiving tube, whereby the operation is based on the rectifying effect of the anode current flowing through the tube. The disadvantage of this known method is that the receiver has to be adjusted in such a manner that the tube is in an oscillating condition and accordingly carries a substantial anode current whereby in turn the sensitivity to incoming signals is considerably decreased. On the other hand, as already pointed out the receiving tube in accordance with the invention should be operated in its state of non-oscillation to be most sensitive to incoming wave energy. This, however is not possible according to the older method in that a certain amount of anode current is necessary for operating the telephone or other device directly inserted in the anode circuit of the receiving tube.

By using a circuit in accordance with the invention, on the other hand, the tube may be operated in its most sensitive condition, that is close to the point of oscillation as no anode current flow is necessary in that the anode potential variations in accordance with the modulating signal of the incoming radio wave, are directly applied to the grid of an ordinary amplifying tube. Thus, on the one hand, a maximum of signalling energy is produced in the receiving tube which on the other hand serves to control the ensuing amplifier with a minimum of losses incurred due to the direct voltage control and the absence of any substantial anode current flow.

Figure 2:
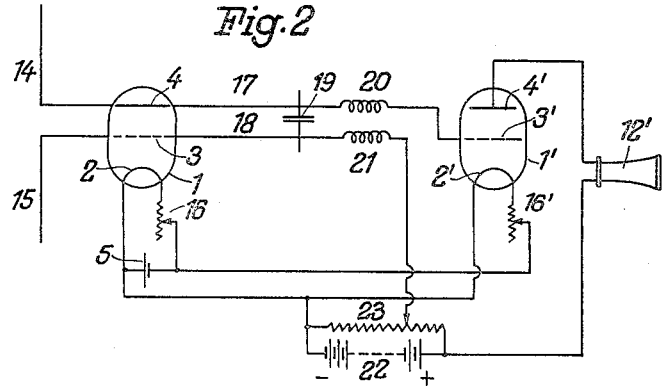
Fig. 2 represents a practical circuit similar to Fig. 1 for receiving and translating ultra-short-wave radio signals.

Referring to Fig. 2 this illustrates a practical circuit for receiving ultra-short-wave signals and merely differs from Fig. 1 in that a tuning system comprising two parallel wires 17 and 18 of well known design has been provided. The effective length of the wires 17 and 18 may be varied in a well known manner such as by telescopic arrangement of the wires or by means of a slidable condenser bridge 19 as shown. The system 17, 18, 19 is tuned together with the antenna 14, 15 to the wave length of the incoming signal, for which purpose condenser 19 is placed at a nodal point of the standing wave produced along the wires 18, 19 by the receiving oscillations, in such a manner that no high frequency potential is impressed upon the grid of the amplifying tube 1'. Choke coils 20 and 21 may furthermore be provided for preventing high frequency energy from entering into the low frequency parts of the system. In this circuit I have shown a common operating battery 22 in combination with a potentiometer 23 to supply the operating potential for both the grid 3 of the receiving tube 1 and for the anode 4' of the amplifying tube 1'. I have furthermore shown a common heating battery 5 for both tubes with variable resistors 16 and 16' in the heating current leads respectively for adjusting the proper heating current values. A telephone 12' is inserted in the anode circuit of the amplifier but it is understood that any other translating device may be provided and that further amplifiers may be connected to the tube 1' in a well known manner. I have shown the grid potential of tube 1' and the anode potential of tube 1 to have zero value, but as is obvious, suitable potentials may be provided in a manner similar to Fig. 1 by means of batteries 10 and 11 and anode leak resistance 9.

Figure 3:
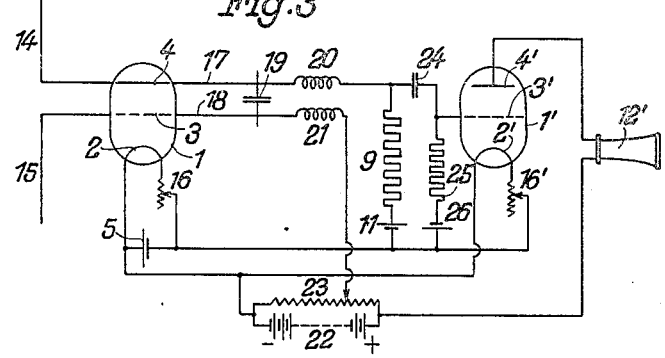
Fig. 3 illustrates a modified receiving circuit embodying the invention.

Referring to Fig. 3, I have shown an alternative way of practicing the invention by providing a coupling condenser 24 in the connecting lead of the anode 4 of the tube 1 to the grid 3' of the tube 1'. In this manner pure potential variations of the varying charge of the anode 4 in accordance with the modulating signal of an incoming wave are imparted to the grid of the amplifier 1'. A further grid leak 25 may be provided for the amplifying tube 1' if necessary in series with a grid biasing battery 26.

Although I have described the invention with specific reference to the showing of the drawing it is understood that the inventive idea may be embodied in various other ways and modification coming within its broad and most comprehensive spirit as expressed in the ensuing claims.

What I claim is:

1. In a receiving circuit for modulated ultra-short-wave signals, comprising a first vacuum tube for receiving said signals, said tube having a cathode, anode and grid electrode, means for operating said tube with a positive grid and free anode electrode to produce ultra-high-frequency oscillations, a second regular amplifying tube operated with a normally unbiased control electrode and means for directly applying modulating potential variations on the anode of said first tube to the control electrode of said second tube.

2. In a receiving circuit for modulated ultra-short-wave signals, comprising a first vacuum tube for receiving and demodulating said signals, said tube having a cathode, anode and grid electrode, means for operating said tube with a positive grid and normally substantially unbiased anode to produce ultra-high-frequency electron oscillations, the tube being normally adjusted to operate close to the point of its oscillating condition, a second regular amplifying vacuum tube including a substantially unbiased grid electrode and a direct conductive coupling connection from the anode of said first tube to the grid of said second tube.

3. In a receiving circuit for ultra-short-wave signals, comprising a first vacuum tube for receiving and demodulating said signals, said tube having a cathode, anode and grid electrode, means for operating said tube with a positive grid and substantially unbiased anode to produce ultra-high-frequency electron oscillations, the tube being normally adjusted to operate close to the point of its condition of oscillation, an input tuning system connected to the grid and anode of said tube, a second regular amplifying tube including a grid electrode and a direct coupling connection from said anode of said first tube to the grid of said second tube.

4. In a system according to claim 3, with a leak resistance connected between the anode and cathode electrode of said first tube.

5. In a receiving circuit for ultra-short-wave signals, comprising a first vacuum tube for receiving and demodulating said signals, said tube having a cathode, an anode and a grid electrode, means for operating said tube with a positive grid to produce ultra-high-frequency electron oscillations, the tube being normally adjusted to operate close to the point of its condition of oscillation, an input circuit connected to the grid and anode of said tube, a second regular amplifying vacuum tube, said second tube having a control grid and a capacitative coupling connection from said anode of said first tube to the grid of said second tube.

6. A system according to claim 5, with a leak resistance connected between the anode and cathode of said first tube.

7. In combination with a receiving circuit for ultra-short-wave signals, a vacuum tube having cathode grid and plate electrode, said plate electrode being operated at substantially zero potential difference with respect to the zero reference point of the system, means including operating potential and input circuit connections for said tube for producing varying electric charges on said plate electrode, in accordance with the modulating current variations of incoming ultra-high-frequency signalling oscillations, and an amplifying tube having a cathode, an anode and a grid electrode, said grid electrode being directly and conductively connected to the plate electrode of said first tube, and a translating device in the anode circuit of said second tube.

8. A circuit as described in claim 7, in which a high ohmic leak resistance is connected between said plate electrode and a point of zero reference potential of said circuit.

9. In a receiving circuit, a first demodulating tube, having cathode, grid and plate electrode, said plate being operated at substantially zero potential in respect to said cathode, means for producing varying electric potential charges on said plate in accordance with modulations of incoming ulra-short-wave signals received by said receiving circuit, and a second regular amplifying tube having cathode, anode and free grid electrode, said free grid being directly and conductively connected to said anode of said first tube, and a translating device connected in the anode circuit of said second tube.

10. In a receiving circuit as described in claim 9, in which a high ohmic leak resistance is connected between said anode and cathode of said first tube.

11. A receiving circuit comprising a vacuum tube including an input electrode and output electrode, said output electrode being operated at substantially zero potential with respect to a point of zero reference potential of said circuit, means for applying modulated ultra-short-wave input signals to said input electrode for producing varying potential charges on said output electrode in accordance with variations of modulating current of said input signals, an amplifying tube having an output circuit and a control electrode, said control electrode being operated at substantially zero potential with regard to the zero reference point of the circuit, a direct conductive coupling connection from the output electrode of said first tube to the control electrode of said second tube, and a translating device inserted in the output circuit of said second tube.

12. A receiving circuit, as described in claim 11, in which a high ohmic leak resistance is connected between the output electrode of said first tube and the zero reference point of the circuit.

HANS ERICH HOLLMANN.